Nov. 3, 1959

C. F. SCHAEFER 2,910,870

FORCE RATIO TRANSDUCER

Filed May 20, 1955

INVENTOR.
CARL F. SCHAEFER

BY
ATTORNEY

INVENTOR.
CARL F. SCHAEFER
BY
ATTORNEY.

United States Patent Office 2,910,870
Patented Nov. 3, 1959

2,910,870

FORCE RATIO TRANSDUCER

Carl F. Schaefer, Pleasantville, N.Y., assignor, by mesne assignments, to United Aircraft Corporation, East Hartford, Conn., a corporation of Delaware Application May 20, 1955, Serial No. 509,844

8 Claims. (Cl. 73—407)

My invention relates to a force ratio transducer and more particularly to an improved force ratio transducer for quickly and accurately determining the ratio between two forces.

In the prior art various devices are employed for determining the ratio of one force or pressure to another force or pressure. The masses of the elements of these devices are not symmetrically disposed at balance which is achieved in the course of obtaining a pressure ratio indication. As a result, the indication includes a position error which must be compensated or corrected for. In devices of the prior art for measuring the ratio of one gaseous pressure to another gaseous pressure, the large pressure volumes are employed with the result that the devices have a slow response to a change in pressure ratio.

I have invented a force ratio transducer which quickly and accurately measures the ratio of one force to another. The masses of the components of my transducer are symmetrically disposed at balance, with the result that the indication obtained includes no position error. My transducer is adapted to measure the ratio of one gaseous pressure to another gaseous pressure. It has a quick response since it requires only small pressure volumes. My transducer has a long life since the force exerted on its balancing means is small. The construction is such that hysteresis effects in the pressure responsive means of my system are negligible.

One object of my invention is to provide a force ratio transducer for quickly and accurately determining the ratio of one force to another force.

Another object of my invention is to provide a force ratio transducer which is balanced to provide an indication which includes no position error.

A further object of my invention is to provide a force ratio transducer having a quick response for determining the ratio of one gaseous pressure to another gaseous pressure.

A still further object of my invention is to provide a force ratio transducer which has a long life.

Still another object of my invention is to provide a force ratio transducer in which hysteresis effects are negligible.

Other and further objects of my invention will appear from the following description.

In general, my invention contemplates the provision of a force ratio transducer including a floating plate and pressure responsive means for applying a first couple proportional to a first pressure to the plate to rotate the plate about a first axis lying in the plane of the plate. I arrange second pressure responsive means for applying a couple proportional to the difference between a second pressure and said first pressure to the plate to rotate the plate about a second axis lying in the plane of the plate and extending at right angles to said first axis. Means responsive to the movement of the plate under the action of the first and second couples shifts a pair of fulcrums associated with the plate to a position to balance the resultant couple of said first and second couples. Indicating means responsive to the means for moving the fulcrums indicates the ratio of the first and second forces.

In the accompanying drawings which form part of the instant specification and which are to be read in conjunction therewith and in which like reference numerals are used to indicate like parts in the various views.

Figure 1:
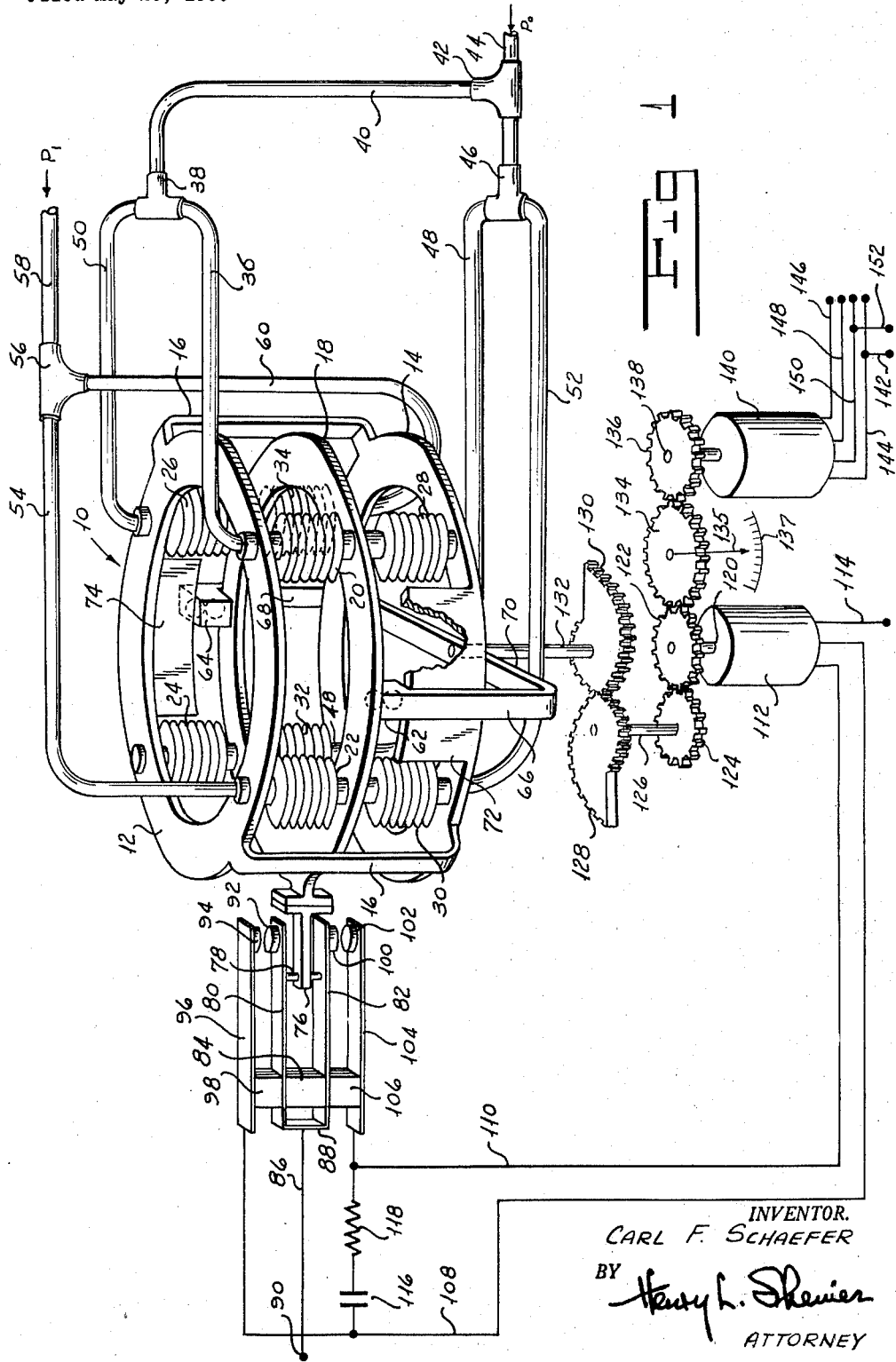
Figure 1 is a schematic perspective view showing one embodiment of my force ratio transducer.

More particularly referring now to Figure 1, my force ratio transducer includes a stationary cage, indicated generally by the reference character 10, which includes a pair of annular stationary plates or the like 12 and 14 maintained in spaced relationship by struts or similar supports 16. I dispose an annular floating plate 18 between stationary plates 12 and 14. Floating plate 18 and plate 12 support between them, by any convenient means, a plurality of pressure responsive devices, such as respective bellows 20, 22, 24 and 26, equally spaced around the annular rings 12 and 18 with bellows 20 diametrically opposite bellows 24 and bellows 22 diametrically opposite bellows 26. Plate 14 and plate 18 support therebetween, by any convenient means, a plurality of pressure responsive devices, such as respective bellows 28, 30, 32 and 34, disposed at equally spaced locations around plates 14 and 18 with bellows 28 diametrically opposite bellows 32 and bellows 30 diametrically opposite bellows 34. The respective bellows 28, 30, 32 and 34 are axially aligned with corresponding bellows 20, 22, 24 and 26.

I provide means for applying pressures to the pressure responsive devices to create couples tending to rotate floating plate 18 about axes at right angles to each other. A pipe 36 communicates with the interior of bellows 20 through plate 12. A fitting 38 connects pipe 36 to a pipe 40. A T-fitting 42 connects pipe 40 to a pipe 44 connected to a suitable source of fluid at a first pressure $P_0$. A T-fitting 46 connects pipe 44 with pipe 48 which communicates with the interior of bellows 32 through the bottom support plate 14. From the structure just described, it will be seen that, since the area of bellows 20 and 32 are equal, these bellows 20 and 32 apply forces, each of which is equal to $P_0A$, to opposite faces of floating plate 18 at diametrically opposite points on the plate, where A is the effective area of each of the bellows 20 and 32. I substantially evacuate, in any convenient manner, the bellows 28 and 24 which are axially aligned with the bellows 20 and 32. The result of the action of the set of bellows including bellows 20, 24, 28 and 32 is the provision of a couple tending to rotate floating plate 18 about an axis lying in the plane of plate 18 and extending at right angles to a line intersecting the common axis of the bellows 24 and 32 and the common axis of bellows 20 and 28. The moment of this couple is $P_0Ad$, where $d$ is the diameter of a circle intersecting the axes of all the bellows, which it will be understood are symmetrically disposed about a circle having a diameter $d$.

A pipe 50 communicating with a pipe 40 by fitting 38 communicates with the interior of bellows 26 through the upper support plate 12. A pipe 52 connected to pipe 44 by T-fitting 46 communicates with the interior of bellows 30 through the bottom support plate 14. Pipes 50 and 52 supply fluid at pressure $P_0$ to the interiors of the respective bellows 26 and 30. The disposition of bellows 26 and 30 is such that they apply respective forces, each of which is equal to $P_0A$, to opposite sides of floating plate 18 at diametrically opposite points on the plate, where A is the effective area of each of the bellows 26 and 30, it being understood that these areas are equal and equal to the respective areas of bellows 20 and 32. A pipe 54 communicates with the inerior of bellows 22 through the upper support plate 12. A T-fitting 56 connects pipe 54 to a pipe 58 supplied with fluid under a second pressure $P_1$. A pipe 60 connected by fitting 56 to pipe 58 communicates with the interior of bellows 34 through the bottom support plate 14. It will be remembered that the respective bellows 22 and 34 are axially aligned with the respective bellows 30 and 26. Bellows 22 and 34 apply respective forces, each of which is equal to $P_1A$, to opposite sides of plate 18 at diametrically opposite points on the plate 18, where A is the effective area of each of bellows 22 and 34 which area is equal to the areas of each of the other bellows. The resultant force acting on plate 18 from the set of bellows, including bellows 22, 26, 30 and 34, is a couple tending to rotate plate 18 about an axis lying in the plane of plate 18 and extending at right angles to a line intersecting the common axis of bellows 22 and 30 and the common axis of bellows 26 and 34. The moment of this couple is $(P_1-P_0)Ad$, where $d$ is the diameter of a circle intersecting the axes of all bellows.

Figure 2:
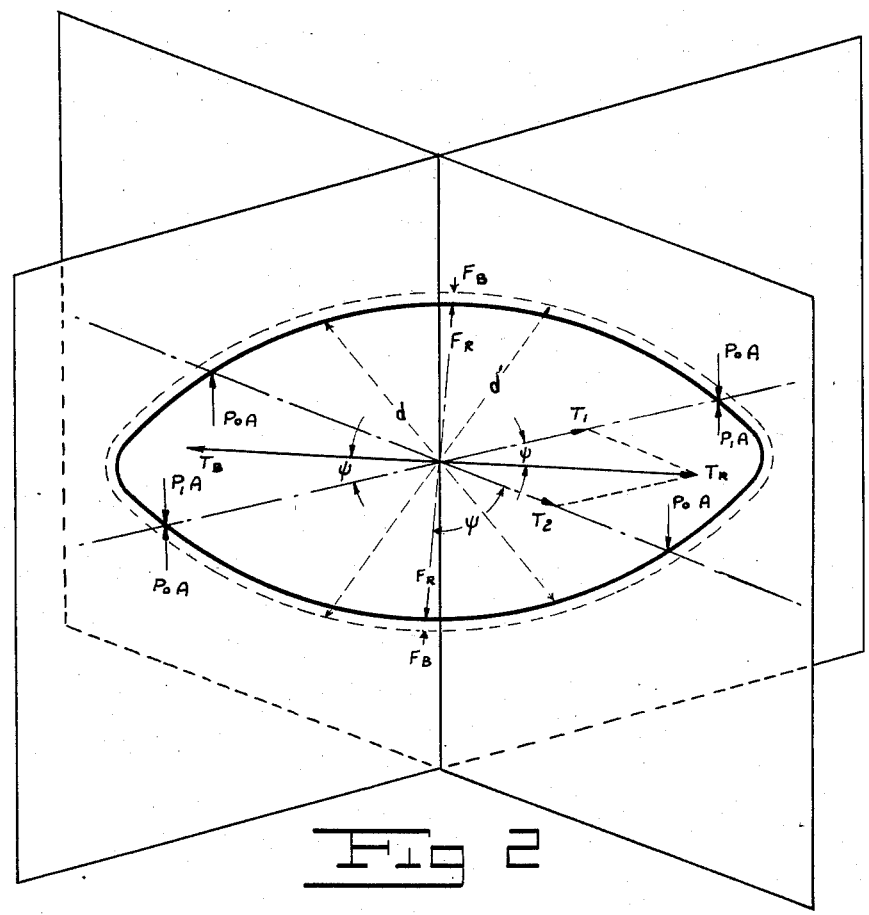
Figure 2 is a diagrammatic view showing the forces acting on the floating plate of my force ratio transducer.
Figure 3:
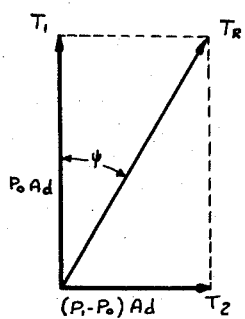
Figure 3 is a vector diagram of the couples acting on the floating plate of my force ratio transducer at balance.

From the structure thus far described, it will be seen that the couple resulting from the set of bellows, including bellows 20, 24, 28 and 32, acts in a plane at right angles to the plane in which the couple resulting from bellows 22, 26, 30 and 24 acts. In Figure 2 I have diagrammatically represented the forces acting on the floating plate 18. The couple resulting from the application of the pressure $P_0$ to ring 18 by bellows 20 and 32 may be represented by a vector $T_1$ in a plane at right angles to the plane in which the couple $P_0Ad$ acts. Similarly, the couple resulting from the application of pressure $P_0$ and pressure $P_1$ to floating plate 18 by bellows 22, 26, 30 and 34 may be represented by a vector $T_2$ in a plane at right angles to the plane in which the couple $(P_1-P_0)Ad$ acts. It will be seen that my two sets of bellows result in a pair of couples acting in planes at right angles to each other. These couples may be vectorially represented by a pair of vectors $T_1$ and $T_2$ acting at right angles to each other. Figure 3 is a vector diagram of the couples acting on the floating plate 18. These two couples produce a resultant couple represented by the vector $T_R$ which makes an angle $\varphi$ with the vector $T_1$. This resultant couple has a moment $F_R d$ and acts in a plane at right angles to $T_R$ where $F_R$ is the force of the resultant couple produced by the forces $P_0A$ and $(P_1-P_0)A$. Since $T_R$ makes an angle $\varphi$ with $T_1$, the resultant couple represented by vector $T_R$ acts in a plane which makes an angle $\varphi$ with the plane in which the couple $P_0Ad$ acts. From the vector diagram this angle may readily be determined as $$(1) \quad \psi = \tan^{-1}\frac{(P_1-P_0)Ad}{P_0Ad} = \tan^{-1}\frac{P_1}{P_0}-1$$

From Equation 1 it can be seen that the angle formed by the plane in which the resultant couple acts and the plane in which the couple $P_0Ad$ acts is a function of the ratio of the pressure $P_1$ to the pressure $P_0$.

I provide a means for applying a balancing couple represented by the vector $T_B$ to balance the resultant torque to obtain a measurement of the ratio of pressure $P_1$ to pressure $P_0$. The balancing couple is equal and opposite to the resultant couple, having a moment $F_B d'$, where $F_B$ is the force necessarily applied in the balancing couple to balance the plate, and acting in a plane making an angle $\psi$ with the plane in which the $P_0Ad$ couple acts. It will be understood that $d'$ is the diameter of a circle passing through the points at which the forces of the balancing couple acts. Referring again to Figure 1, my balancing means includes a pair of respective ball bearing fulcrums 62 and 64 carried by the respective arms 66 and 68 of a U-shaped member having a base 70. Fulcrum 62 rides between the underside of floating plate 18 and the upper edge of a bearing flange 72 formed on the bottom support plate 14. Fulcrum 64 rides between the upper surface of floating plate 18 and the edge of a depending bearing flange 74 formed on the upper support plate 12. Fulcrums or pivots 62 and 64 engage floating plate 18 on opposite sides or faces at substantially diametrically opposite points separated by a distance $d'$.

I provide means for moving pivots 62 and 64 to a position where they exert a balancing couple on plate 18 which is equal and opposite to the resultant couple produced by the bellows. Floating plate 18 carries an arm 76 formed of insulating material. A pin 78 carried by arm 76 is adapted to engage a pair of respective spring contact arms 80 and 82 formed of a suitable conducting material, such as copper or a copper alloy. A block 84 of insulating material mounts arms 80 and 82 in spaced relationship. A conductor 86 connects the base 88 of the means forming arms 80 and 82 to a terminal 90 of a source of electrical energy. Arm 80 carries a contact 92 for engaging a contact 94 carried by a conducting arm 96 mounted in spaced relationship to arm 80 by a block 98 of insulating material. Arm 82 carries a contact 100 for engaging a contact 102 carried by an arm 104 mounted in spaced relationship to arm 100 by a block 106 of insulating material. Respective conductors 108 and 110 connect arms 96 and 104 to a pair of input terminals of a servomotor 112. A conductor 114 connects the common terminal of motor 112 to ground. When the couple resulting from the sets of bellows pivots plate 18 in a direction to move arm 76 up, as viewed in Figure 1, contact 92 engages contact 94 to complete the circuit of motor 112 to rotate pivots 62 and 64 in a direction to balance the resultant torque in a manner to be described. When the resultant torque from the sets of bellows pivots plate 18 to move arm 76 down, as viewed in Figure 1, contact 100 engages contact 102 to complete the circuit of motor 112 to rotate pivots 62 and 64 in a direction to balance the resultant couple. I connect a spark suppressor circuit including a capacitor 116 and a resistor 118 in series between conductors 108 and 110 to reduce sparking on the making or breaking of contacts 92 and 94 and contacts 100 and 102.

Motor 112 includes an output shaft 120 which carries a gear 122 for rotation with it. Gear 122 drives a gear 124 which drives a shaft 126. Shaft 126 mounts a cam gear 128 for rotation with it. Cam gear 128 engages and drives a cam gear 130 fixed on a shaft 132 for rotation therewith. I fix the base 70 carrying the pivot supporting arms 66 and 68 on shaft 132 so that when shaft 132 rotates, pivots 62 and 64 move. It will be remembered from Equation 1 that the tangent of the angle $\psi$ between the plane in which the resultant couple produced by the bellows acts and the plane in which the couple $P_0Ad$ acts is proportional to $$\frac{P_1}{P_0}-1$$

I form cam gears 128 and 130 with contours to generate a tangent function. In other words, a given amount of rotation of shaft 126 displaces shaft 132 through an angle whose tangent is proportional to the angular displacement of shaft 126. Therefore, if shaft 132 rotates through an angle $\psi$ to bring the system to balance, the amount of rotation of shaft 126 will be proportional to $$\frac{P_1}{P_0}-1$$

It will be seen that the amount of rotation of servomotor shaft 120 to produce this rotation of shaft 126 is directly proportional to the ratio of pressure $P_1$ to pressure $P_0$. When shaft 132 rotates through the angle $\psi$ it moves pivots 62 and 64 to balance the resultant couple produced by the bellows and to return plate 18 to a neutral position where neither contacts 92 and 94 nor contacts 100 and 102 are engaged.

For purposes of convenience, I have considered each of the bellows of my device as having an equal effective area A and have shown equal moment arms $d$. I may arange my device to measure a quantity, such as Mach number M, by selecting proper values of effective bellows area and moment arm. I may so select the values that they account for the constant K in the relationship (2) $\quad \dfrac{P_2}{P_1} = \left(1 + \dfrac{\gamma-1}{2} M^2\right)^{\dfrac{\gamma-1}{\gamma}} = K \tan \psi$ Where $P_2$ is Pitot tube pressure, $P_1$ is static pressure and $\gamma$ is the ratio of specific heat at constant pressure to specific heat at constant volume.

Gear 122 drives a gear 134 which drives a gear 136 carried for rotation with the shaft 138 of a synchronous transmitter 140. Since the rotation of gear 134 is directly proportional to the ratio of pressure $P_1$ to the pressure $P_0$, it may directly indicate the pressure ratio. For example, a pointer 135 carried by the shaft of gear 134 for rotation with it may be associated with a scale 137 calibrated to read pressure ratio. Alternate means may be provided for producing an electrical signal proportional to the pressure ratio. This signal may energize an indicating instrument or it may be employed in any desired manner. It will be appreciated that shaft 138 also rotates proportionally to the ratio of $P_1$ to $P_0$. A conductor 142 connects an input conductor 144 of transmitter 140 to the source of electrical energy including terminal 90. I connect the output conductors 146, 148 and 150 of the transmitter 140 to any suitable receiving or indicating means. A conductor 152 connects conductor 150 to ground to provide a common conductor for the transmitter. As shaft 120 rotates to bring the system back to balance, shaft 138 rotates and the indicating device or the like associated with synchronous transmitter 140 is energized in proportion to the ratio of $P_1$ to $P_0$.

It is to be noted that the distance $d'$ between the points of action of pivots 62 and 64 is greater than the distance between the points of action of any pair of diametrically opposite bellows. As a result, only a relatively small force need be exerted by the pivots to balance the couple resulting from the bellows. This arrangement increases the life of the pivots.

In operation of my force ratio transducer, I supply fluid under a first pressure $P_0$ to pipe 44. Pipes 36 and 48 apply this pressure to the interior of bellows 20 and 32 which are axially aligned with the respective evacuated bellows 28 and 24. This application of fluid under pressure results in a force couple on floating plate 18 acting in a plane passing through the axes of bellows 20, 24, 28 and 32. As can more easily be seen by reference to Figure 2, this couple has a moment $P_0 A d$ where A is the effective area of each of the bellows and $d$ is the distance between the points of action of diametrically opposite pairs of bellows 20 and 28 and 24 and 32. Pipes 50 and 52 supply fluid under pressure $P_0$ to the interior of bellows 26 and 30. I supply fluid under a second pressure $P_1$ to pipe 58 and pipes 54 and 60 pass this fluid to the interior of the respective bellows 22 and 34 which are axially aligned with bellows 30 and 26. These applications of pressure result in a couple acting on plate 18 in a plane passing through the axes of the bellows 22, 26, 30 and 34. As can best be seen by reference to Figure 2, this couple has a moment $(P_1-P_0) A d$ where A is the effective area of each bellows and $d$ is the distance between the points of action of the bellows on plate 18. As has been explained hereinabove, the couple resulting from the action of bellows 20, 24, 28 and 32 acts in a plane at right angles to the plane in which the couple resulting from the action of bellows 22, 26, 30 and 34 acts. These two couples produce a resultant couple which acts in a plane which makes an angle $\psi$ with the plane in which the couple resulting from bellows 20, 24, 28 and 32 acts. This resultant couple pivots the floating plate 18 about pivots 62 and 64 to move arm 76 up to engage contacts 92 and 94 or to move arm 76 down to engage contacts 100 and 102. The engagement of contacts 92 and 94 or the engagement of contacts 100 and 102 energizes motor 112 to drive shaft 132 through cams 128 and 130 in one direction or the other to move pivots 62 and 64 so as to produce a balancing couple equal and opposite to the resultant couple. Owing to the shape of cams 128 and 130, the rotation of shaft 120 to achieve a balance is directly proportional to the ratio of $P_1$ to $P_0$. The amount of rotation of shaft 138 also is proportional to the ratio $$\dfrac{P_1}{P_0}$$

and the indicating pointer 135 or an indication device actuated by synchronous transmitter 140 indicates this pressure ratio.

While I have shown and described my device as being adapted to determine the ratio of two pressures, it will be appreciated that my floating plate arrangement could as well be employed to determine the ratio between any pair of forces. To accomplish this I substitute some other force-applying means for the bellows. The action of my device would then be as described as will readily be understood by those skilled in the art.

It will be appreciated that at balance the floating plate 18 always occupies the same position at which arm 76 does not engage either contacts 92 and 94 or 100 and 102. In other words, my system is symmetrically disposed at balance with the result that the indication provided includes no position error. Since the bellows in my system are captive, the effects of hysteresis in the bellows are negligible. Further since the distance between the points of action of pivots 62 and 64 is greater than the distance $d$ between the points of action of any pair of diametrically opposite bellows, the forces on the pivots may be smaller than the pressure force. This ensures a longer life for the balls of the pivots and a small frictional force at the pivots. The use of oppositely positioned bellows enables me to keep the pressure volumes used to obtain an indication small. As a result my device has a quick response since only small pressure changes are required to produce an unbalance in the system. Further, the fluids, the pressure ratio of which is to be determined, are contained within the bellows to reduce the possibility of leakage in the system.

It will be seen that I have accomplished the objects of my invention. I have provided a force ratio transducer which produces accurate indications including substantially no position error. When my device is employed to determine pressure ratio, it has a quick response. The force exerted by the balancing means is small with the result that this means has a long life. Hysteresis effects in my system are negligible.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A force ratio transducer for measuring the ratio between a first force and a second force including in combination a plate, means for applying a first couple proportional to said first force to said plate to rotate the plate about a first axis, means for applying a second couple proportional to the difference between the second force and the first force to said plate to rotate the plate about a second axis at right angles to the first axis, said first and second axes lying in the plane of said plate, said first and second couples producing a resultant couple tending to displace said plate, means movable in the plane of said plate for applying a third couple to said plate to cause the third couple to be effective about an axis lying in the plane of said plate, and a means responsive to the displacement of said plate for positioning said movable means to balance said third couple against said resultant couple.

2. A force ratio transducer as in claim 1 including indicating means responsive to said movable means for indicating the ratio of said first force to said second force.

3. A force ratio transducer as in claim 1 including means responsive to said movable means for producing an electrical signal proportional to the ratio of said second force to said first force.

4. A force ratio transducer as in claim 1 in which the means for applying the first couple to the plate includes a set of bellows comprising two pairs of bellows, the bellows of each of said pairs being disposed on opposite sides of said plate, said pairs of bellows being located at diametrically opposite points on said plate, means for applying a first pressure to one bellows of each of said pairs of bellows, said one bellows of a first pair being on one side of said plate and said one bellows of the other pair being on the other side of said plate, said other bellows of each pair being evacuated.

5. A force ratio transducer as in claim 1 in which said means for applying said second couple to the plate includes a set of bellows comprising two pairs of bellows, the bellows of each of said pairs being disposed on opposite sides of said plate, said pairs of bellows being located at diametrically opposite points on said plate, means for applying a first pressure to one bellows of each pair, said one bellows of a first pair of said bellows acting on one side of said plate and said one bellows of the other pair acting on the opposite side of said plate, and means for applying a second pressure to the other bellows of each of said pairs.

6. A force ratio transducer as in claim 1 in which said plate is a flat plate having a pair of opposite faces and in which the means for applying a third couple includes a pair of pivots and means mounting said pivots to engage the opposite faces of said plate at diametrically opposite positions to apply said third couple to said plate.

7. A force ratio transducer as in claim 1 in which said means responsive to the displacement of said plate includes a motor, means for energizing said motor to rotate in one direction or the other as said resultant couple displaces said plate in one direction or the other, and means driven by said motor to position said movable means to balance said third couple against said resultant couple.

8. A force ratio transducer as in claim 1 in which said means responsive to the displacement of said plate includes a motor, means for energizing said motor to rotate in one direction or the other as said plate is displaced in one direction or the other by said resultant couple, and cam gears driven by said motor for positioning said movable means to balance said third couple against said resultant couple.

References Cited in the file of this patent

UNITED STATES PATENTS

| | | |
|---|---|---|
| 2,538,824 | Andresen | Jan. 23, 1951 |
| 2,598,681 | Garbarini et al. | June 3, 1952 |
| 2,736,199 | Ibbott | Feb. 28, 1956 |
| 2,740,295 | Perchonok | Apr. 3, 1956 |
| 2,770,968 | Grey | Nov. 20, 1956 |

FOREIGN PATENTS

| | | |
|---|---|---|
| 1,053,156 | France | Dec. 16, 1953 |

OTHER REFERENCES

Instruments, vol. 27 (March 1954), pages 442 and 443.